United States Patent
Xue et al.

(10) Patent No.: US 11,429,834 B1
(45) Date of Patent: Aug. 30, 2022

(54) NEURAL-BASED AGENT ASSISTANCE INTERFACE FOR PROVIDING ANSWERS BASED ON A QUERY VECTOR

(71) Applicant: INTUIT INC., Mountain View, CA (US)

(72) Inventors: Zijun Xue, Mountain View, CA (US); Jessica Ting-Yu Ko, Mountain View, CA (US); Neo Yuchen, Mountain View, CA (US); Ming-Kuang Daniel Wu, Mountain View, CA (US); Chucheng Hsieh, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 654 days.

(21) Appl. No.: 16/125,212

(22) Filed: Sep. 7, 2018

(51) Int. Cl.
| | |
|---|---|
| *G06N 3/00* | (2006.01) |
| *G06N 3/08* | (2006.01) |
| *G06N 3/04* | (2006.01) |
| *G06F 40/30* | (2020.01) |
| *G06F 40/284* | (2020.01) |

(52) U.S. Cl.
CPC ........... *G06N 3/006* (2013.01); *G06F 40/284* (2020.01); *G06F 40/30* (2020.01); *G06N 3/0427* (2013.01); *G06N 3/08* (2013.01)

(58) Field of Classification Search
CPC ......... G06N 3/006; G06N 3/0427; G06N 3/08
See application file for complete search history.

(56) References Cited

U.S. PATENT DOCUMENTS

| | | | | |
|---|---|---|---|---|
| 5,559,940 A | * | 9/1996 | Hutson | G01S 15/899 715/234 |
| 6,173,275 B1 | * | 1/2001 | Caid | G06F 16/58 706/14 |
| 11,048,702 B1 | * | 6/2021 | Kumar | G06N 3/0427 |
| 2006/0078862 A1 | * | 4/2006 | Goto | G09B 7/02 434/322 |
| 2010/0017392 A1 | * | 1/2010 | Dian | G06F 16/334 707/E17.109 |

(Continued)

OTHER PUBLICATIONS

Ma et al. (Learning to Answer Questions from Image Using Convolutional Neural Network, Mar. 2016, pp. 3567-3573) (Year: 2016).*

(Continued)

*Primary Examiner* — George Giroux
(74) *Attorney, Agent, or Firm* — Patterson & Sheridan, LLP

(57) ABSTRACT

Certain aspects of the present disclosure provide techniques for providing automated intelligence in a support session. In one example, a method includes generating a set of tokens based on a text-based query posted by a support agent to a live chat thread; generating a set of vectors based on the set of tokens; extracting a set of features based on the set of tokens; generating a query vector based on the set of vectors and the set of features; determining a predicted intent of the text-based query based on the query vector, wherein the predicted intent is one of a plurality of predefined intents; determining a predicted answer to the text-based query based on: the query vector; and the predicted intent; and providing the predicted answer to the text-based query in the live chat thread.

20 Claims, 7 Drawing Sheets

(56) References Cited

U.S. PATENT DOCUMENTS

| | | | |
|---|---|---|---|
| 2011/0093258 A1* | 4/2011 | Xu | G06F 40/237 |
| | | | 704/9 |
| 2012/0136650 A1* | 5/2012 | Udupa | G06F 40/232 |
| | | | 704/9 |
| 2015/0234920 A1* | 8/2015 | Tawfik | G06F 16/951 |
| | | | 707/724 |
| 2017/0075988 A1* | 3/2017 | Kadiri | G06F 16/3329 |
| 2017/0308519 A1* | 10/2017 | Peng | G06F 16/33 |
| 2018/0225365 A1* | 8/2018 | Altaf | G06F 16/3344 |
| 2018/0300415 A1* | 10/2018 | Rehurek | G06F 16/9535 |
| 2018/0330729 A1* | 11/2018 | Golipour | G10L 15/16 |
| 2019/0130248 A1* | 5/2019 | Zhong | G06F 16/2462 |
| 2019/0138660 A1* | 5/2019 | White | G06F 16/90332 |
| 2019/0188271 A1* | 6/2019 | Murdock | G06F 16/24575 |
| 2019/0188590 A1* | 6/2019 | Wu | H04L 51/02 |
| 2019/0392285 A1* | 12/2019 | Manaharlal Kakkad | |
| | | | G06F 40/30 |
| 2020/0057946 A1* | 2/2020 | Singaraju | G06N 5/041 |

OTHER PUBLICATIONS

Guo et al. (Intent-Aware Query Similarity, Oct. 2011, pp. 259-268) (Year: 2011).*

* cited by examiner

NEURAL-BASED AGENT ASSISTANCE INTERFACE FOR PROVIDING ANSWERS BASED ON A QUERY VECTOR

INTRODUCTION

Aspects of the present disclosure relate to a neural-based customer support agent assistance interface.

Excellent customer service is a driving factor of success for almost any type of organization. Recently, business to consumer (B2C) organizations have invested increasing amounts of resources to improve the quality of customer service, which in-turn drives the success of the organization through, for example, longer and more significant customer relationships, referrals based on positive experiences, high-ratings by industry analysts, and the like.

Maintaining a high level of customer service is difficult in its own right, and the challenge is compounded for businesses with periodically variable customer service demands because such businesses may need to employ transient support agents with less training and experience from time to time. For example, a business that provides tax preparation software and support for the same may need significantly more customer support agents during "tax season" as compared to other parts of the year. So the additional challenge is how to maintain high standards for customer service while having a variable workforce-especially because at the end of each busy season, the seasonal customer support agents, and all their acquired knowledge and training, leave the organization. This problem is particularly acute in organizations that need to hire large numbers of seasonal customer support agents, which may measure in the thousands.

Organizations have tried to address these challenges in a variety of ways. For example, organizations may retain highly-experienced or "expert" customer support agents that are tasked with assisting less experienced or "general" customer support agents, which may include seasonal or other transient customer support agents. To this end, organizations have implemented tools to allow customer support agents to interact amongst themselves on the "backend" while the support agents are concurrently interacting with customers on the "frontend"-such as on the phone or through a text-based support "chat" interface. However, while effective, this conventional practice is nevertheless limited by the number of expert customer support agents that are available to guide the general support agents, and so the staffing and cost problem is not resolved.

It has been observed, especially in text-based customer support threads (or "chats" or "channels"), that customer support agents often ask identical or similar questions repetitively based on likewise similar or identical customer queries. For example, a general customer support agent may inquire repeatedly over time about what a particular error code means, or how to change an account feature, or how to interpret a warning message, just to name a few examples. While training helps reduce occurrences of certain questions being posed in internal support threads, it is generally impractical to expect every customer support agent to memorize the answers to a myriad of frequently asked questions-especially in the case of seasonal customer support agents.

While the repetitive asking of questions for which there are readily known answers may seem manageable or even insignificant for any given instance, in the aggregate it can become a significant drain on customer service resources. For example, an organization's customer support agents may field 20,000 questions daily, which in turn demands a significant amount of time and efforts from expert customer support agents, and therefore presents an opportunity for optimization.

In order to avoid the expense of maintaining more human customer support agents, some organizations have tried to implement fully automated "virtual support agents", such as interactive "chatbots," which directly interface with customers. However, such automated virtual support agents have generally lacked in capability as compared to human customer support agents, which has led to negative customer sentiment towards the automated virtual support agents, and customers seeking alternative support channels—or even worse, alternative software or service providers.

Despite best efforts, existing methods for supporting customer support agents leave much room for improvement. In particular, expert customer support agents are time-burdened by having to provide the same answers to the same questions over and over again. Accordingly, systems and methods are needed to provide scalable and automated support systems for customer support agents.

BRIEF SUMMARY

Certain embodiments provide a method for providing automated intelligence in a support session, including: generating a set of tokens based on a text-based query posted by a support agent to a live chat thread; generating a set of vectors based on the set of tokens; extracting a set of features based on the set of tokens; generating a query vector based on the set of vectors and the set of features; determining a predicted intent of the text-based query based on the query vector, wherein the predicted intent is one of a plurality of predefined intents; determining a predicted answer to the text-based query based on: the query vector; and the predicted intent; and providing the predicted answer to the text-based query in the live chat thread.

Other embodiments provide systems configured to perform methods for providing automated intelligence in a support session, such as the aforementioned method, as well as non-transitory computer-readable mediums comprising instructions that, when executed by a processor of a processing system, cause the processing system to perform methods for providing automated intelligence in a support session.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for providing automated assistance to a support agent.

A superior solution to conventional support agent assistance mechanisms is to provide, for example, an automated, artificial intelligence-based, support agent assistance interface. For example, many organizations already provide communication system(s) to their customer support agents. However, these existing communications systems only allow the customer support agents to ask questions among themselves.

An AI-enhanced customer support agent assistance interface can provide an automated answering service that determines the best answers to questions, especially frequently asked questions, and provide those answers to customer support agents within existing communication applications. In this way, the customer support agent need not learn to use a new system, do independent research, or otherwise depart from the customer support agent's typical workflow. Rather, the AI-based support system, which may in some examples be in the form of an automated chatbot that responds within support channels or threads, may intervene only once a customer support agent's question has been received and a "best answer" has been determined. Where no best answer is determined, the automated chatbot may take no action, and therefore not interrupt the workflow of the customer support agent.

Figure 1:
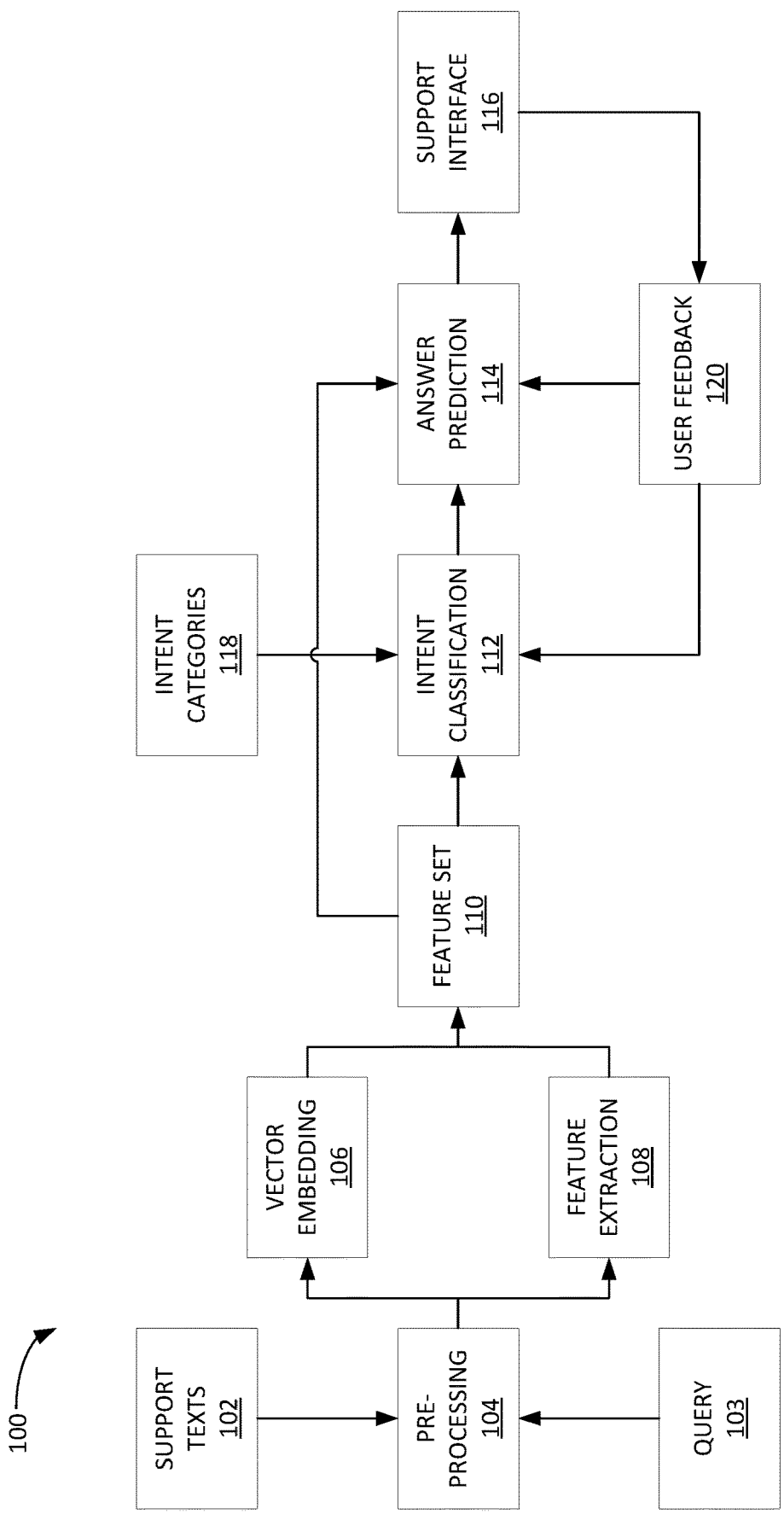
FIG. 1 depicts an example process architecture for providing automated assistance to a support agent.

Example Process Architecture for Providing Automated Customer Support Agent Assistance FIG. 1 depicts an example process architecture 100 for providing automated assistance to a support agent.

Process 100 starts with receiving (or retrieving) support texts 102. For example, support texts 102 may be retrieved from text-based support sessions (e.g., chats, posts, or threads, and others), for example, within a support channel.

In some examples, support texts 102 may be retrieved in a periodic manner by obtaining raw data from a support channel in the form of a "data dump." Support texts 102 may be received in a known format, such as plaintext, comma separated value (CSV), extensible markup language (XML), JavaScript Object Notation (JSON), or others.

Pre-Processing Support Texts

Process 100 then moves to pre-processing 104. Pre-processing 104 may include a variety of tasks to prepare the data for use in other aspects of process 100. For example, pre-processing 104 may include stemming support texts 102, which is the process of reducing inflected (or sometimes derived) words to their word stem, base, or root form. Stemming algorithms such as Porter's Algorithm and others may be applied during stemming.

Pre-processing 104 may also include lemmatization, which is a more complex approach to determining a stem of a word that involves first determining the part of speech of a word, and applying different normalization rules for each part of speech. In lemmatization, the part of speech is first detected prior to attempting to find the root since for some languages, the stemming rules change depending on a word's part of speech.

Pre-processing 104 may also include performing stochastic stemming algorithms to find word stems, which involve using probabilities to identify the root form of a word. Stochastic algorithms may be trained on a table of root form to inflected form relationships to develop a probabilistic model. Such a model may be expressed in the form of complex linguistic rules, similar in nature to those in lemmatization. Stochastic stemming may be performed by inputting an inflected form of a word to a trained model and having the model produce the root form according to its internal ruleset. This is similar to lemmatization, except that output word is chosen based on having the highest probability of being correct.

In some cases, stemming and lemmatization approaches may be used together in hybrid approaches.

Pre-processing 104 may also include tokenization, which is the process of converting a sequence of characters (such as a word) into a token with an assigned meaning. For example, the word "apple" may be associated with a dictionary ID "123" whereas "orange" may be associated with a dictionary ID "241". Some methods used to identify tokens in text, such as support texts 102, include: regular expressions, specific sequences of characters termed a flag, specific separating characters called delimiters, and explicit definition by a dictionary. Special non-alphabetical characters, including punctuation characters, are commonly used to identify tokens because of their natural use in written languages; however, tokenization may ultimately eliminate all the non-alphabetical symbols in the original text.

Pre-processing 104 may also include term replacement, which is the process of replacing recognized names, entities, email addresses, currency numbers, and others in order for better word embedding results. For example, a company name such as "ABC Corp." may be replaced by "<company name>", or an email address such as abc@corp.com may be replaced by "<email>". Notably, the aforementioned forms of the replacement are merely exemplary, and many other replacement formats may be used.

In some examples, support texts 102 are first converted to all lowercase before performing any other pre-processing operation, such as stemming, lemmatization, tokenization, term replacement, or others.

In some examples, support texts 102 are indexed with timestamps (e.g., for individual entries, posts, etc.) so that, for example, initial question texts and related reply texts can be joined together.

Vector Embedding

Vector embedding is a language modeling and feature learning techniques where, for example, characters, words, or phrases from a known vocabulary are mapped to vectors of real numbers. Vector embedding aims to quantify and categorize semantic similarities between linguistic items based on their distributional properties in large samples of language data.

One type of vector embedding, word embedding, involves a mathematical embedding from a space with one dimension per word to a continuous vector space with a much lower dimensionality. Word embedding may be performed by algorithms such as "word2vec" with a resulting vector space in which vectors of similar words and phrases tend to have close cosine similarity.

Conventional word embedding, however, does not perform well with words that are not known to the embedding scheme. The so-called "out of vocabulary" problem means that information may be lost in conventional word embedding implementations. This problem is particularly acute in less formal written language, such as the text-based conversations (e.g., chats, posts, or threads) found in customer support channels. Such conversations may frequently use organization or industry-specific jargon, abbreviations, or acronyms. For example, "cx" may regularly be used by an organization's customer support agents to refer to a "customer," despite that not being an otherwise well-known or frequently used abbreviation. While efficient for humans with common knowledge of the jargon, such jargon can be problematic for conventional vector embedding techniques.

To solve the problem of out of vocabulary text (e.g., jargon or abbreviations) in support texts 102, character embedding may be used. In a character embedding model, the vector for a word is constructed from the character n-grams that compose it. Since character n-grams are shared across words, these models do better than word embedding models for out of vocabulary words. Character embedding is particularly useful for misspelled words, emoticons, new words, and the like.

Character embedding models may be trained using organization-specific corpora, such as support texts 102. The character embedding model may be based on, for example, a convolutional neural network, or as another example, open-source tools such as Gensim (a vector space modeling and topic modeling toolkit). Using character embedding models on organization-specific datasets may alleviate or even eliminate the out of vocabulary problem. For example, after training on organization-specific corpora, the cosine similarity between "cx" and "customer" may approach 0.9 (where 1 would mean perfect correspondence).

Vector embedding 106 may thus include creating two sets of vectors: a first set of word-embedded vectors, and a second set of character-embedded vectors. In some examples, the vectors may be concatenated together to form a single vector embedding based on a support text 102 (or query as further described below).

Feature Extraction

Feature extraction 108 starts from an initial set of data (in this example, support texts 102) and generates derived features intended to be informative and non-redundant, which may facilitate subsequent learning and generalization steps.

Generally, feature extraction can be critical in complex domains for performance of resulting predictive models. For example, customer service is a complex domain where customer service agents frequently rely on their domain knowledge gathered from prior cases and solutions to recognize the type of customer service questions from keywords or key sentences in, for example, support texts 102.

The presence of specific keywords or entities in support texts 102 may be a strong indication of certain types of questions within the individual texts (e.g., an individual support chat transcript). For example, a question that contains currency numbers and keywords such as "bills" or "receipts" may refers to a case where a customer is confused about a monthly payment increase after a discount period expires. Therefore, a carefully designed feature set can lead to better model performance.

In process architecture 100, features may be extracted from support texts 102 in order to augment vector embedding 106 for increased performance of models built on the features, such as intent classification model 112 and an answer prediction model 114.

For example, name entity recognition (NER) techniques may be used to extract meaningful entities such as company names and people names. For example, open-source software such as "spaCy" (a natural language processing package) may be used for recognizing names.

As another example, email addresses and currency numbers may be recognized using pattern-based regular expressions.

As yet another example, identification numbers may be detected, such as an identification number associated with a customer's account, a support case number, a license number, and others. In some cases, the identification numbers may be extracted by matching known prefixes for certain types of identification numbers, such as "CAN" for customer account number or "CASE" for a support case number.

As yet another example, organization-specific terms may be extracted, such as the name of products or services offered by that organization. Such organization-specific terms may be maintained in glossaries, which include identifications of synonyms.

Notably, while many pattern-based feature extraction techniques are discussed herein, other forms of feature extraction may also be used. For example, independent component analysis, principal component analysis, multi-factor dimensionality reduction, and other techniques may be used to perform feature extraction 108 (and dimensional reduction).

Combined feature set 110 includes vectors from vector embedding 106 as well as extracted features from feature extraction 108. In some examples, a single vector for each individual support text 102 (e.g., chat thread, chat session, post and reply, etc.) may comprise embedded features (e.g., from vector embedding 106) and other extracted features (e.g., from feature extraction 108.) That is, all of the features generated during vector embedding 106 and feature extraction 108 may be concatenated together to form a single vector with a cumulative feature set. When vector embedding 106 and feature extraction 108 are performed on query 103, the resulting vector may be referred to as a query vector.

Intent Classification

Figure 3:
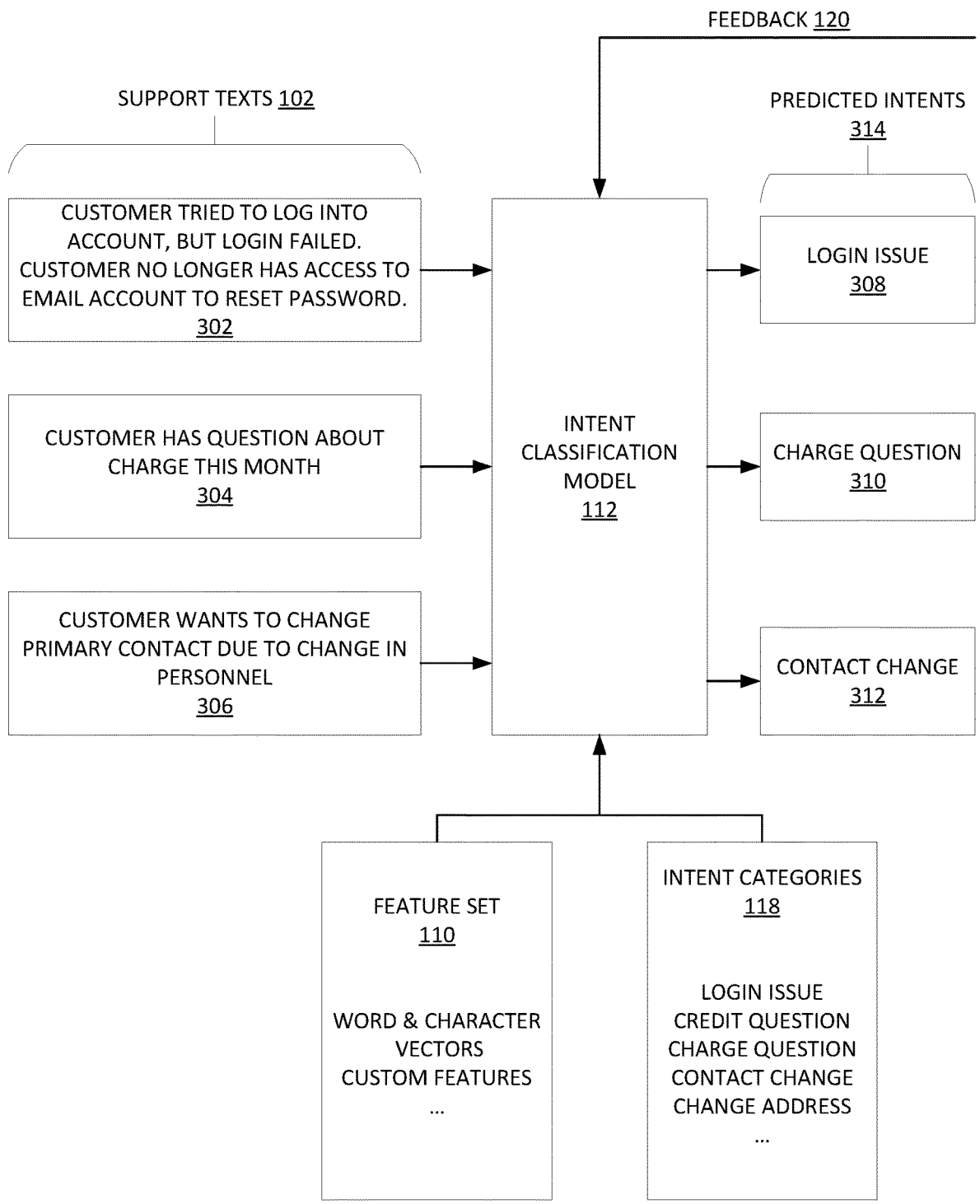
FIG. 3 depicts an example of predicting intent using an intent classification model.

Intent classification model 112 maps each support text 102 to a specific predefined intent category within a set of intent categories 118. An example of the intent classification model 112 is depicted in FIG. 3.

Figure 2:
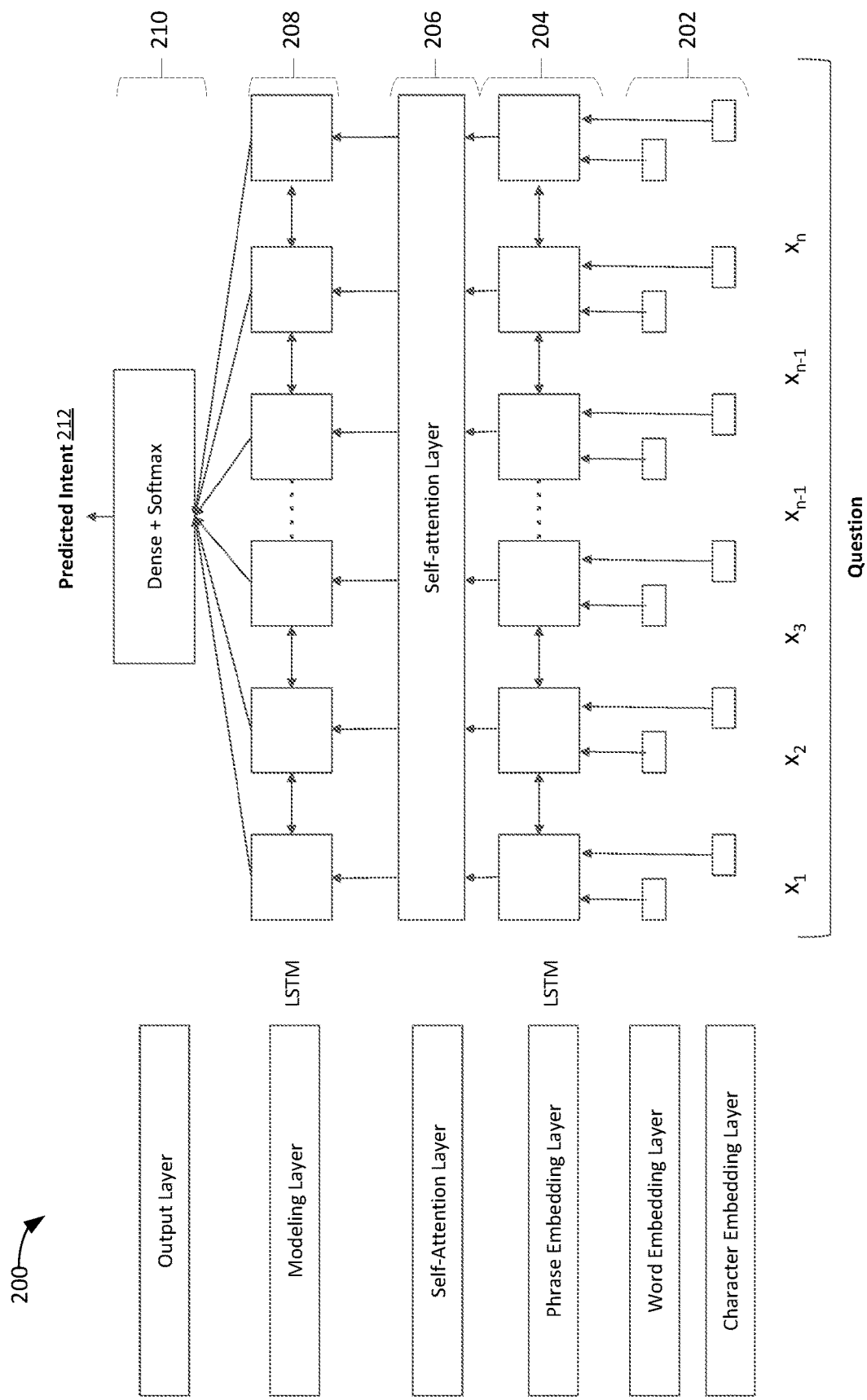
FIG. 2 depicts an example of a neural-based intent classification model architecture.

In one example, intent classification model 112 is a neural-based model, such as the example model described with respect to FIG. 2. In some implementations, the input to the neural-based intent classification model is feature set 110, which (as described above) includes the vector embedded features and the custom extracted features.

Answer Prediction

Answer prediction model 114 may compare processed support texts 102 (e.g., questions previously asked by customer support agents) to a new query 103 (e.g., a newly asked question by a customer support agent). In this way, similar support texts 102 (e.g., historical questions) with known answers may be matched to query 103 so that a live customer support agent need not re-answer a question that has previously been answered. Instead, a historical support text 102 with a known good answer (e.g., one that has been verified by an expert customer support agent) can be provided to support interface 116 (e.g., in the form of a post or chat message) in order to provide a customer support agent with automated and nearly instantaneous answers. Thus, the institutional knowledge of expert support agents may be leveraged without the need to increase the number of expert support agents available at any given time.

The answer prediction model 114 may take inputs based on feature set 110 as well as a predicted intent from intent classification model 112. Further, user feedback 120 may be used to further train and refine answer prediction model 114.

Query 103 may be retrieved, in some examples, by an automated software routine or "listener" agent that monitors, for example, a support channel for newly posted questions.

Figure 4:
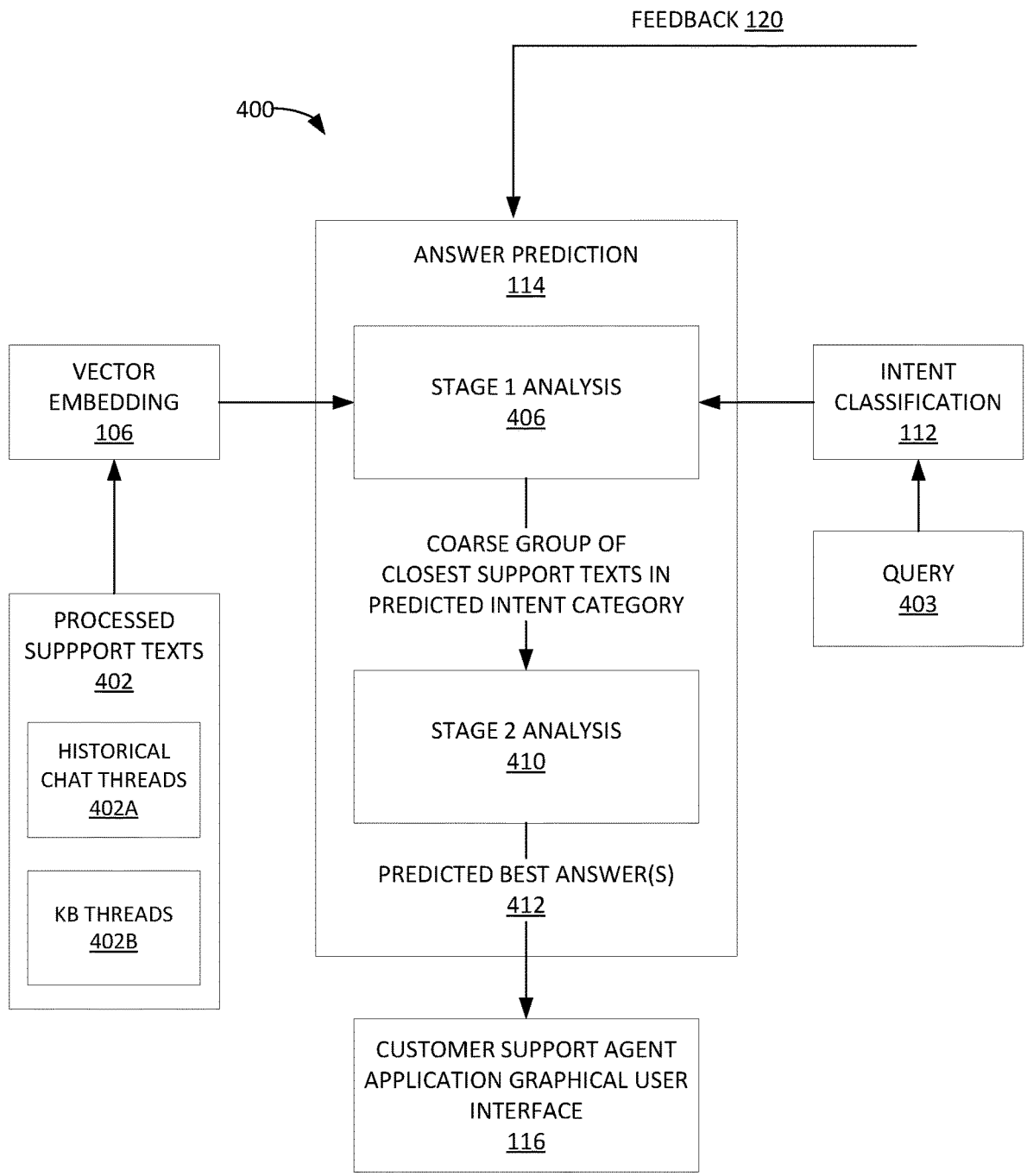
FIG. 4 depicts an example of a two-stage answer prediction model architecture.

FIG. 4, described below, describes one embodiment of a two-stage answer prediction model that could be used as answer prediction model 114.

User Feedback

Figure 6:
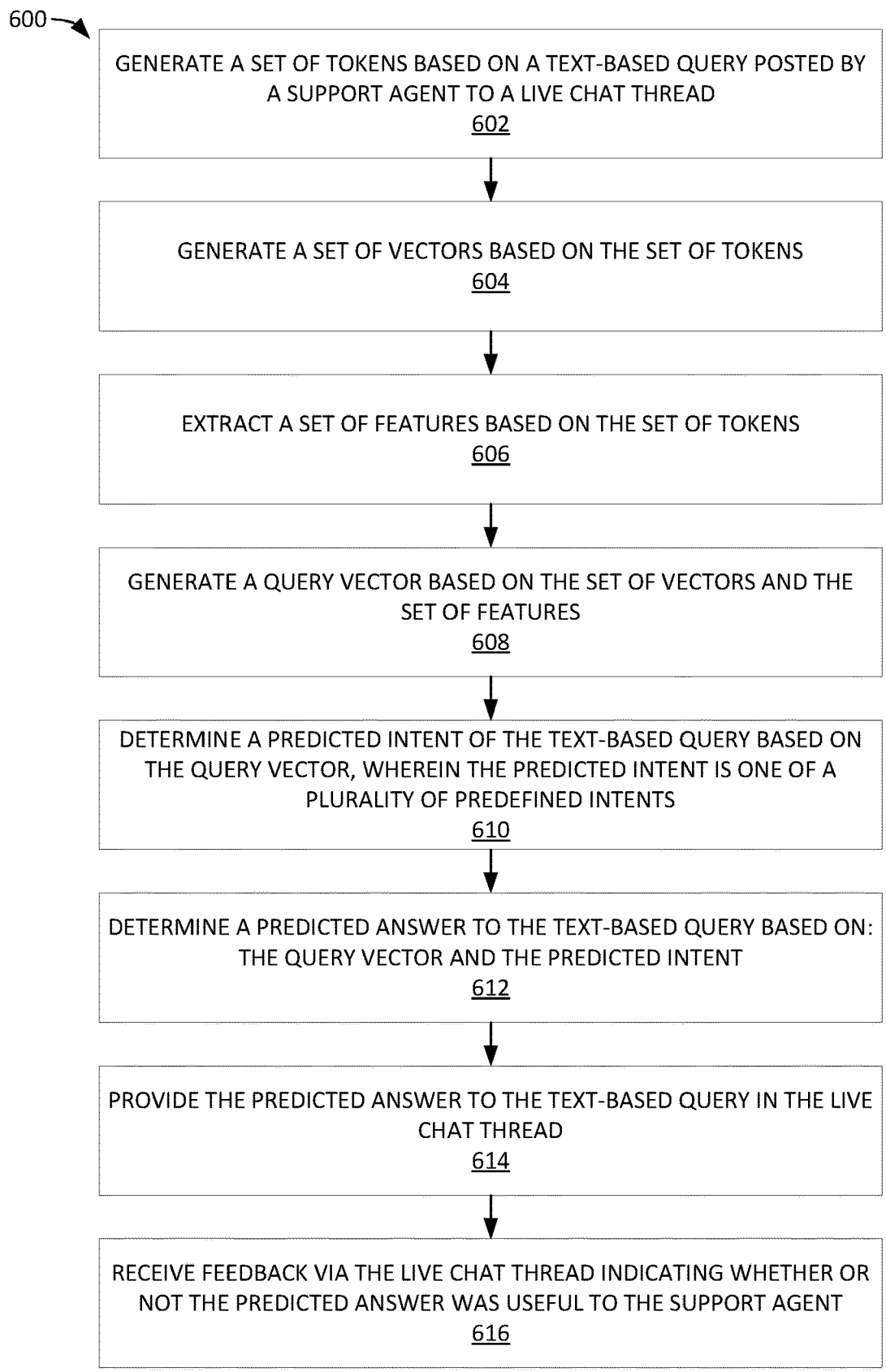
FIG. 6 depicts an example method for providing automated intelligence in a support session.

For continuous improvement of models within the process architecture 100, user feedback 120 may be obtained from the support interface 116 based on the best answer or answers predicted by answer prediction model 114. In one example, buttons within a graphical user interface of a communication program used by customer support agents may be used to solicit user feedback 120 from customer support agents without disrupting the conversation flow, as depicted in FIG. 6. The acquired user feedback 120 may be used for re-training various aspects of the prediction models to improve model performances, such as for intent classification model 112 and answer prediction model 114.

Model Cold Start

An issue may arise when first deploying the models within process architecture 100 if there is not enough labeled data for training the intent classification model 112. To address this problem, a feature-based annotation method may be used whereby keyword phrases are created as features and applied as keyword phrase filters to the responses in each support text 102. For example, "Master Admin claim" may be a common solution for resolving account related issues. Thus, a filter may be defined to detect "Master Admin claim" and its synonyms such as "MA claim" to find all matched conversations and label them as "account related issue". The assumption behind using such a feature-based annotation method is that many questions are asked repetitively. Since answers may be mainly provided by a small number of expert customer service agents, the word selection by this small group of expert customer service agents is likely to be very consistent for these repetitive questions. Thus, a feature-based annotator may successfully label a large number of support texts, which then serve as the initial data points to train intent classification model 112.

Example Real World Implementation

In one example, a cloud service platform (e.g., AMAZON WEB SERVICES®) provides the capability for hosting a communication platform (e.g., SLACK®) through a collaboration model (e.g., AWS ChatOps). The communication platform may be modified with webhooks and interactive components to handle the interactive messages, and creating a service API to interact with cloud services instances.

Example Neural-Based Intent Model Architecture

FIG. 2 depicts an example of a neural-based intent classification model architecture 200 used to generate a vector representation for each support text (e.g., question) and to predict the correct intent category for the support text.

In particular, the neural-based intent classification model architecture 200 consists of the following layers. First, an input layer 202 (comprising a word embedding sublayer and character embedding sublayer), wherein pre-trained word and character embeddings from the organization-specific corpora are used. In some examples, unseen words may be replaced with an UNSEEN token, which translates to a predefined special embedding for the token.

Second, a phrase embedding Bi-directional Long-Short Term Memory (BiLSTM) network layer 204 is used to generate a hidden representation for each token.

Third, a self-attention layer 206 is used to generate an output of a uniform length from sentences of varying lengths. For the self-attention layer 206, the "layernorm" and residual structure may be used to encapsulate each attention layer.

Fourth, a densely connected modeling layer 208 is used to feed an output layer 210, which outputs a predicted intent 212. In some implementations, a "softmax" function is used at the output layer, which is a form of normalized exponential function that is a generalization of the logistic function that squashes a K-dimensional vector of z arbitrary real values to a K-dimensional vector $\sigma(z)$ of real values, where each entry is in the range (0, 1), and all the entries add up to 1.

Notably, neural-based intent classification model architecture 200 is just one example, and other architectures for predicting intent may also be used.

Example of Predicting Intent Using Intent Classification Model

FIG. 3 depicts an example of predicting intents 314 using an intent classification model 112.

In the example depicted in FIG. 3, support texts 102 are input to a pre-trained intent classification model 112, such as described with respect to FIG. 2. Intent classification model 112 may be trained based on a feature set 110 to classify support texts 102 according to predefined intent categories 118. Though not shown in this figure for simplicity, support texts 102 may be pre-processed prior to being input to intent classification model 112, as described with respect to FIG. 1.

In this example, support text 302 recites (in unprocessed form): "customer tried to log into account, but login failed. customer no longer has access to email account to reset password" and intent classification model 112 predicts an intent 308 of "login issue". As another example, support text 304 recites "customer has a question about charge this month" and intent classification model 112 predicts an intent 310 of "charge question". As yet another example, support text 306 recites "customer wants to change primary contact due to change in personnel" and intent classification model 112 predicts an intent 312 of "contact change". Notably, these are just a few examples.

As described with respect to FIG. 1, user feedback 120 may be used to re-train and refine intent classification model 112.

Example of a Two-Stage Answer Prediction Model

FIG. 4 depicts an example of a two-stage answer prediction model architecture 400.

As depicted, a new query 403 (e.g., from a customer support agent) is received and a predicted intent of query 403 is determined intent classification model 112, such as described with respect to FIGS. 1-3.

Processed support texts 402 may include, for example, historical chat threads 402A and/or knowledge base (KB) threads or pages 402B, or other text-based information, which have been pre-processed, as described above with respect to FIG. 1.

Each processed support texts 402 may be embedded into a vector by a vector embedding 106. For example, each sentence in each processed support texts 402 may be quantified using a tool such as "sentence2vec". In one example, a sentence2vec model considers each n-gram inside a sentence S and generates the overall sentence embedding by averaging all of the n-gram embeddings. Accordingly, where R(S) represents the set of all possible n-grams for sentence S and $v_w$ denotes each n-gram embedding, the sentence embedding vs can be computed by using the formula:

$$V_S := \frac{1}{|R(S)|} V_{R(S)} = \frac{1}{|R(S)|} \sum_{w \in R(S)} V_w$$

In the depicted example, answer prediction model 114 is implemented using a two stage model. In the first stage analysis 406, a query vector based on query 403 is compared to processed support texts 402 (e.g., having been processed into sentence embedded vectors as described above). The comparison may be based on a cosine similarity between the query vector and the processed support text vectors, or any other form of comparing the similarity of vectors.

In some examples, processed support texts 402 are initially filtered by their intent classification so that only processed support texts 402 with the same intent classification as query 403 are considered during first stage analysis 406. This may serve to significantly speed up first stage analysis 406 of answer prediction model 114.

First stage analysis 406 determines a "coarse" set of support texts (e.g., existing questions recorded in support sessions between customer support agents) that are similar to query 103 (e.g., a new question posed by a customer support agent). In some examples, the number of support texts identified in first stage analysis 406 may be limited to further speed up the stage. For example, course group may be limited to the top five hundred similar support texts (e.g., questions).

The second stage of answer prediction model 114 may use another analytic, such as word mover distance, to evaluate the similarity between the query vector based on query 403 and the course group of support texts identified in first stage analysis 406.

Word mover distance may be defined as the minimum value of the sum of the word embedding's cosine distance between a set of word pairs. Each word pair consists of one word from the first sentence and the other word from the second sentence. For example, given two sentences: "The boy eats apples" and "The child enjoys candies", three word pairs can be constructed: {boy, children}, {eats, enjoys}, and {apples, candies}. The distance between word i and word j may thus be denoted as:

$$c(i, j) = \|x_i - x_j\|^2$$

Assuming word i is mapped to word j for $T_{ij}$ times, the word mover distance can be represented as the following constrained optimization problem:

$$\min_{T>0} \sum_{i,j=1}^{n} T_{ij} c(i, j)$$

Accordingly, to predict one or more best answers 412, a word mover distance is calculated for each combination of the query vector based on query 403 and each support text vector from the course group of closest support texts identified by first stage analysis 406.

In some cases, answer prediction model 114 does not return a predicted best answer because either none exists, or none of the "best" answers exceeded a minimum confidence threshold. For example, the minimum confidence threshold may be based on a maximum word mover distance, minimum cosine similarity, or any other metric measuring the closeness between the query vector based on query 103 and the sentence-embedded processed support texts 102.

The one or more best answers 412 are then provided to a customer support agent application graphical user interface 116, an example of which is described below with respect to FIG. 5.

Answer prediction model 114 may receive user feedback 120, for example, from a customer support agent via the graphical user interface 116, an example of which is described below with respect to FIG. 5. The user feedback 120 in this example may be in the form of labeled support texts, where the label indicates that the support text was a useful answer for a given query.

Example User Interface

Figure 5:
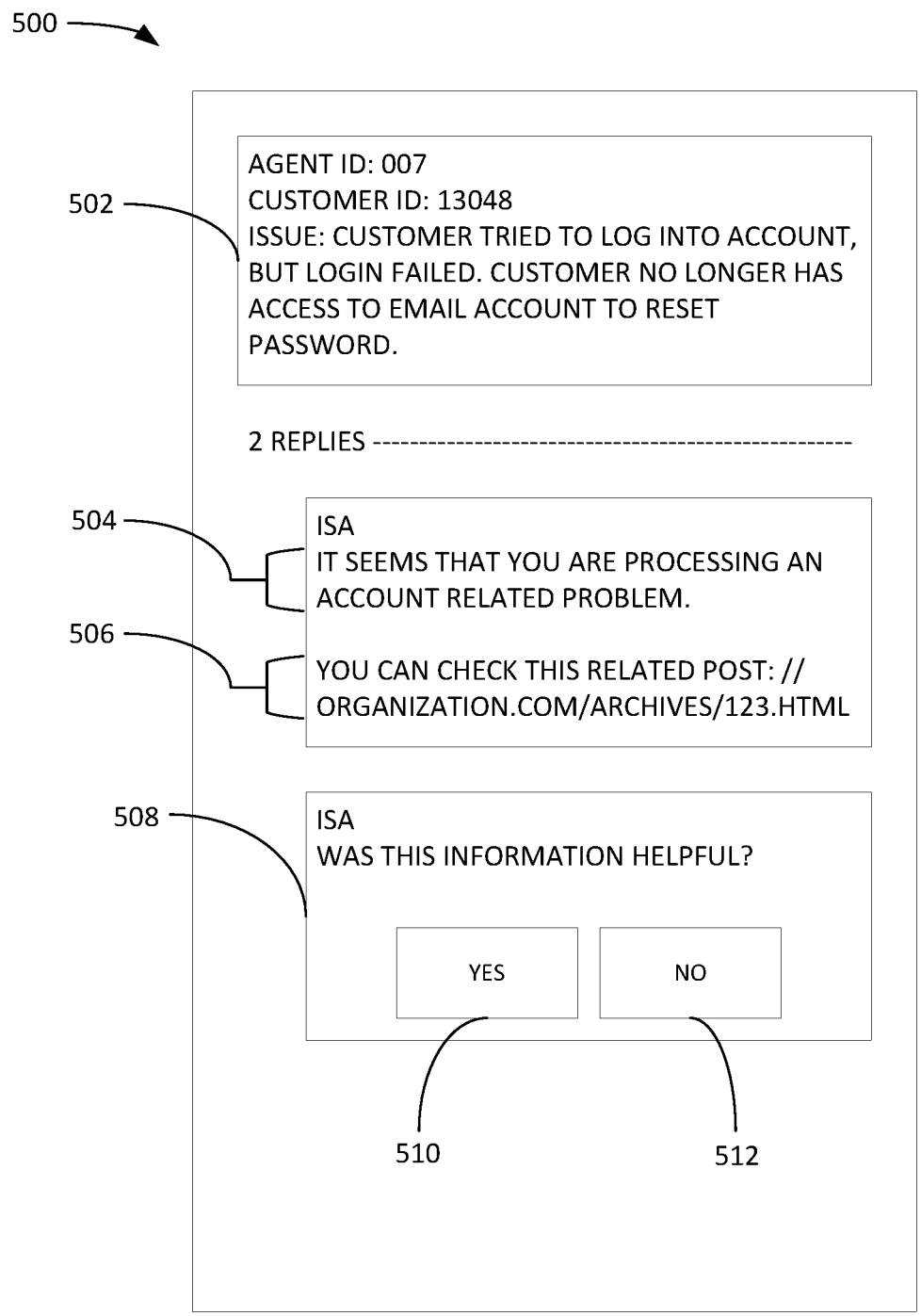
FIG. 5 depicts an example of a user interface within a communication program usable by customer support agents.

FIG. 5 depicts an example of a user interface 500 within a communication program usable by customer support agents. In some examples, the communication program may be a program like SLACK® or similar, which includes "channels" in which various threads contain posts or chats from customer support agents seeking answers to questions. The channels, for example, may be dedicated to different topic areas (e.g., different applications or features within applications). Further, each channel may have a membership that is either pre-defined, or defined based on participation in the channel (e.g., whereby any person that contributes to the channel becomes a member). Each thread within a channel may include an initiating question and one or more answers to that question in the form of posts or chats to the thread. Each thread may alternatively be referred to as a "session."

As depicted in FIG. 5, a customer support agent (here with agent ID 007), may post a question 502, which is a type of support text, in a communication program used by other customer support agents in an organization. Here, the customer support agent is posting question 502 in hopes of receiving answers from other customer support agents. However, the ability of other customer support agents to provide an answer may be limited by the number of other, available, and knowledgeable (i.e., with respect to question 502) customer support agents.

In order to provide nearly instant answers to the customer support agent's question, an artificial intelligence (AI)-based "chatbot" named "ISA" (for "interactive smart agent") replies to the custom support agent. The customer support agent assistance's chatbot may be based on the concepts discussed in FIGS. 1-4. Notably, the reply may include both a predicted intent 504 and one or more best answers, which in this case is a single best answer 506. In some cases, the reply may only include a best answer, or the predicted intent and one or more best answers may be provided in separate replies.

Answer 506 may include other support texts, such as historical chats, posts, threads, knowledge base articles, how-to videos, presentations, documents, or any other media that is associated with an answer to question 502.

Further, the AI-based chatbot may provide a feedback user interface element 508 with selectable buttons 510 and 512 for providing feedback (e.g., user feedback 120 described above with respect to FIGS. 1, 3, and 4.

Notably, the AI-based chatbot replies do not prevent other customer support agents from also responding to the original question 502. Rather, additional replies may show up in the list of replies, including those by the AI-based chatbot. In this way, the AI-based chatbot may be integrated with existing communication applications without fundamental user interface modification.

The user interface design for an AI-based chatbot, such as depicted in FIG. 5, is important, so several functional aspects may be considered. For example, the AI-based chatbot may be configured to not initiate private individual chats with customer support agents. Instead, the AI-based chatbot may be configured to "listen" to chats (or posts) created by customer support agents (e.g., 502) and then to join a predefined chat (or channel or thread), for example by providing answer 506, after it is initiated by the live customer support agent. Such a design enables seamless integration into existing customer service workflows without requiring customer service agents to change their habits.

By way of example, sending a reply as a follow-up message in the same message thread instead of sending a direct private chat to the inquiring customer service agent (or posting a new thread to a customer support channel) avoids the recipient agent needing to switch between chat windows. Further, responding directly to the inquiring customer support agent avoids posting to a support channel in a way that is broadcast to every member of the channel, which can become unnecessarily distracting for other customer support agents not involved in the message thread. Lastly, providing a feedback user interface element 508 in the thread promotes giving feedback on the quality of the answer posted by the AI-based chatbot, which in-turn promotes improvement of the underlying models.

Further, because a predicted answer is not necessary for the conventional functionality of a communication platform used by customer support agents, such as that described with respect to FIG. 5, the lack of a predicted best answer does not impact the customer service agent's experience.

Example Method for Providing Automated Intelligence in a Support Session

FIG. 6 depicts an example method 600 for providing automated intelligence in a support session.

Method 600 begins at step 602 with generating a set of tokens based on a text-based query posted by a support agent to a live chat thread. For example, the text-based query could be like question 502 described with respect to FIG. 5. In some examples, generating the set of tokens includes stemming each word in the text-based query, and generating the set of tokens based on each stemmed word.

Method 600 then proceeds to step 604 with generating a set of vectors based on the set of tokens. For example, the vectors may include one or more of character vectors, word vectors, or sentence vectors, as described above with respect to FIGS. 1 and 4. In some examples, the set of vectors includes a first subset of word-embedded vectors and a second subset of character-embedded vectors.

Method 600 then proceeds to step 606 with extracting a set of features based on the set of tokens. For example, features may be extracted using name entity recognition, pattern-based regular expressions to detect identification numbers and organization-specific terms, as described above with respect to FIG. 1.

Method 600 then proceeds to step 608 with generating a query vector based on the set of vectors and the set of features. As described above with respect to FIG. 1, a single query vector may be formed by concatenating the one or more types of vectors, such as word and character vectors, as well as features into a single vector.

Method 600 then proceeds to step 610 with determining a predicted intent of the text-based query based on the query vector, wherein the predicted intent is one of a plurality of predefined intents. For example, as described above with reference to FIGS. 2 and 3, an intent prediction may be based on a neural-based intent classification model, itself based on a feature set and a predefined set of possible intent categories, with the query vector as an input to the neural-based intent classification model.

Method 600 then proceeds to step 612 with determining a predicted answer to the text-based query based on: the query vector and the predicted intent. For example, as described above with respect to FIG. 4, a two stage answer prediction model may be used to determine the one or more best answers with the query vector and the predicted intent as inputs to the answer prediction model. In some examples, using the answer prediction model includes performing a first stage analysis wherein the query vector is compared to a set of historical chat threads having the same predicted intent of the text-based query in order to identify a first candidate group of historical chat threads, and performing a second stage analysis wherein a word mover distance is calculated between the query vector and each respective historical chat thread in the first candidate group of historical chat threads in order to identify the predicted answer.

Method 600 then proceeds to step 614 with providing the predicted answer to the text-based query in the live chat thread. For example, as described above with respect to FIG. 5, an automated chatbot may respond automatically to a customer service agent's question being posted within a support channel.

Method 600 then proceeds to step 616 with receiving feedback via the live chat thread indicating whether or not the predicted answer was useful to the support agent. For example, as described above with respect to FIG. 5, a feedback user interface element may be provided along with the best answer or answers so that a customer support agent may easily provide feedback that can be used to improve the predictive models.

Notably, method 600 is just one example, and other examples of methods with more or fewer steps are possible as described herein.

Figure 7:
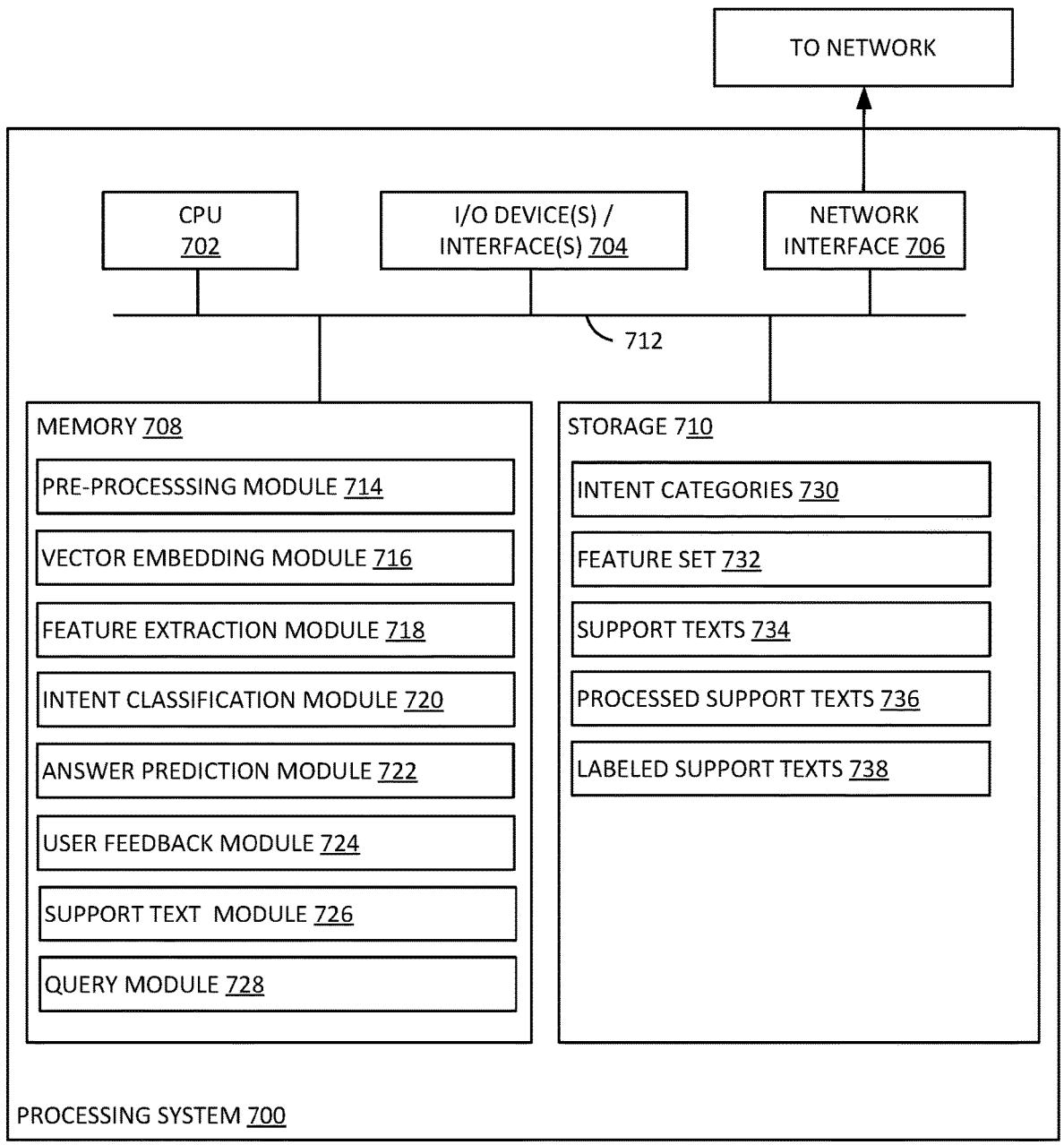
FIG. 7 depicts a processing system that may be used to perform a method for providing automated intelligence in a support session.

Example of Processing System for Providing Automated Intelligence in a Support Session FIG. 7 depicts a processing system 700 that may be used to perform methods described herein, such as the method for providing automated intelligence in a support session described above with respect to FIG. 6.

Processing system 700 includes a CPU 702 connected to a data bus 712. CPU 702 is configured to process computer-executable instructions, e.g., stored in memory 708 or storage 710, and to cause processing system 700 to perform methods as described herein, for example with respect to FIGS. 1-6. CPU 702 is included to be representative of a single CPU, multiple CPUs, a single CPU having multiple processing cores, and other forms of processing architecture capable of executing computer-executable instructions.

Processing system 700 further includes input/output device(s) and interface(s) 704, which allows processing system 700 to interface with input/output devices, such as, for example, keyboards, displays, mouse devices, pen input, and other devices that allow for interaction with processing system 700. Note that while not depicted with independent external I/O devices, processing system 700 may connect with external I/O devices through physical and wireless connections (e.g., an external display device).

Processing system 700 further includes network interface 706, which provides processing system 700 with access to external networks and thereby external computing devices.

Processing system 700 further includes memory 708, which in this example includes pre-processing module 714, which may perform pre-processing functions as described above, for example with respect to FIGS. 1 and 6.

Memory 708 further includes vector embedding module 716, which may perform vector embedding functions as described above, for example with respect to FIGS. 1 and 6.

Memory 708 further includes feature extraction module 718, which may perform feature extraction functions as described above, for example with respect to FIGS. 1 and 6.

Memory 708 further includes intent classification module 720, which may perform intent classification functions as described above, for example with respect to FIGS. 1-3 and 6.

Memory 708 further includes answer prediction module 722, which may perform best answer prediction functions as described above, for example with respect to FIGS. 1, 4, and 6.

Memory 708 further includes user feedback module 724, which may perform user feedback functions as described above, for example with respect to FIGS. 1 and 3-6.

Memory 708 further includes support text module 726, which may gather support texts for pre-processing functions as described above, for example with respect to FIGS. 1, 4, and 6.

Memory 708 further includes query module 728, which may listen for or otherwise receive queries as described above, for example with respect to FIGS. 1 and 4-6.

Note that while shown as a single memory 708 in FIG. 7 for simplicity, the various aspects stored in memory 708 may be stored in different physical memories, but all accessible CPU 702 via internal data connections, such as bus 712.

Processing system 700 further includes storage 710, which in this example includes intent categories 730, which may be like intent categories 118 described above with respect to FIGS. 1 and 3.

Storage 710 further includes feature set 732, which may be like feature set 110 described above with respect to FIGS. 1 and 3.

Storage 710 further includes support texts 734, which may be like support texts 102 described above with respect to FIGS. 1 and 3.

Storage 710 further includes processed support texts 734, which may be like processed support texts 402 described above with respect to FIG. 4.

Storage 710 further includes labeled support texts 734, for example as described above with respect to FIG. 4.

While not depicted in FIG. 7, other aspects may be included in storage 710.

As with memory 708, a single storage 710 is depicted in FIG. 7 for simplicity, but the various aspects stored in storage 710 may be stored in different physical storages, but all accessible to CPU 702 via internal data connections, such as bus 712, or external connection, such as network interface 706.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing automated intelligence in a support session, comprising:
   generating a set of tokens based on a text-based query posted by a support agent to a live chat thread;
   generating a set of vectors based on the set of tokens;

extracting a set of features based on the text-based query;
generating a query vector comprising the set of vectors and the set of features by concatenating the set of vectors and an additional vector, wherein the additional vector is created based on the set of features;
determining a predicted intent category for the text-based query from a set of intent categories based on the query vector;
filtering a plurality of historical chat threads based on the predicted intent category to determine a subset of the plurality of historical chat threads that have been previously classified within the predicted intent category, wherein a size of the subset is limited to a configured maximum number of historical chat threads;
determining a predicted answer to the text-based query based on determining word mover's distances between the query vector and a respective vector embedding of each historical chat thread in the subset;
and providing the predicted answer to the text-based query in the live chat thread.

2. The method of claim 1, wherein determining the predicted intent category comprises using a neural-based intent classification model with the query vector as an input to the neural-based intent classification model.

3. The method of claim 1, wherein determining the predicted answer to the text-based query comprises using an answer prediction model with the query vector and the predicted intent category as inputs to the answer prediction model.

4. The method of claim 1, wherein generating the set of tokens further comprises:
stemming each word of a set of words in the text-based query; and
generating the set of tokens based on each stemmed word.

5. The method of claim 1, wherein the set of vectors comprises:
a first subset of word-embedded vectors; and
a second subset of character-embedded vectors.

6. The method of claim 1, further comprising receiving feedback via the live chat thread indicating whether or not the predicted answer was useful to the support agent.

7. The method of claim 6, wherein a subsequent predicted answer is determined based on the feedback.

8. A processing system, comprising:
a memory comprising computer-executable instructions; and
a processor configured to execute the computer-executable instructions and cause the processing system to:
generate a set of tokens based on a text-based query posted by a support agent to a live chat thread;
generate a set of vectors based on the set of tokens;
extract a set of features based on the text-based query;
generate a query vector comprising the set of vectors and the set of features by concatenating the set of vectors and an additional vector, wherein the additional vector is created based on the set of features;
determine a predicted intent category for the text-based query from a set of intent categories based on the query vector;
filter a plurality of historical chat threads based on the predicted intent category to determine a subset of the plurality of historical chat threads that have been previously classified within the predicted intent category, wherein a size of the subset is limited to a configured maximum number of historical chat threads;
determine a predicted answer to the text-based query based on determining word mover's distances between the query vector and a respective vector embedding of each historical chat thread in the subset; and
provide the predicted answer to the text-based query in the live chat thread.

9. The processing system of claim 8, wherein the processor being configured to cause the processing system to determine the predicted intent category comprises the processor being configured to cause the processing system to use a neural-based intent classification model with the query vector as an input to the neural-based intent classification model.

10. The processing system of claim 8, wherein the processor being configured to cause the processing system to determine the predicted answer to the text-based query comprises the processor being configured to cause the processing system to use an answer prediction model with the query vector and the predicted intent category as inputs to the answer prediction model.

11. The processing system of claim 8, wherein the processor being configured to cause the processing system to generate the set of tokens further comprises the processor being configured to cause the processing system to:
stem each word of a set of words in the text-based query; and
generate the set of tokens based on each stemmed word.

12. The processing system of claim 8, wherein the set of vectors comprises:
a first subset of word-embedded vectors; and
a second subset of character-embedded vectors.

13. The processing system of claim 8, wherein the processor is further configured to cause the processing system to receive feedback via the live chat thread indicating whether or not the predicted answer was useful to the support agent.

14. The processing system of claim 13, wherein a subsequent predicted answer is determined based on the feedback.

15. A non-transitory computer-readable medium comprising instructions that, when executed by a processor of a processing system, cause the processing system to perform a method for providing automated intelligence in a support session, the method comprising:
generating a set of tokens based on a text-based query posted by a support agent to a live chat thread;
generating a set of vectors based on the set of tokens;
extracting a set of features based on the text-based query;
generating a query vector comprising the set of vectors and the set of features by concatenating the set of vectors and an additional vector, wherein the additional vector is created based on the set of features;
determining a predicted intent category for the text-based query from a set of intent categories based on the query vector;
filtering a plurality of historical chat threads based on the predicted intent category to determine a subset of the plurality of historical chat threads that have been previously classified within the predicted intent category, wherein a size of the subset is limited to a configured maximum number of historical chat threads;
determining a predicted answer to the text-based query based on determining word mover's distances between the query vector and a respective vector embedding of each historical chat thread in the subset; and
providing the predicted answer to the text-based query in the live chat thread.

16. The non-transitory computer-readable medium of claim 15, wherein determining the predicted intent category comprises using a neural-based intent classification model with the query vector as an input to the neural-based intent classification model.

17. The non-transitory computer-readable medium of claim 15, wherein determining the predicted answer to the text-based query comprises using an answer prediction model with the query vector and the predicted intent category as inputs to the answer prediction model.

18. The non-transitory computer-readable medium of claim 15, wherein:
   generating the set of tokens further comprises:
      stemming each word of a set of words in the text-based query; and
      generating the set of tokens based on each stemmed word; and
   the set of vectors comprises:
      a first subset of word-embedded vectors; and
      a second subset of character-embedded vectors,
   The non-transitory computer-readable medium of claim 15, further comprising: receiving feedback via the live chat thread indicating whether or not the predicted answer was useful to the support agent.

19. The non-transitory computer-readable medium of claim 15, further comprising receiving feedback via the live chat thread indicating whether or not the predicted answer was useful to the support agent.

20. The non-transitory computer-readable medium of claim 19, wherein a subsequent predicted answer is determined based on the feedback.

* * * * *